(12) United States Patent
Miyoshi et al.

(10) Patent No.: US 7,817,729 B2
(45) Date of Patent: Oct. 19, 2010

(54) METHOD AND APPARATUS FOR MULTICARRIER COMMUNICATION

(75) Inventors: Kenichi Miyoshi, Yokohama (JP); Jun Cheng, Soraku-gun (JP)

(73) Assignee: Panasonic Corporation, Osaka (JP)

( * ) Notice: Subject to any disclaimer, the term of this patent is extended or adjusted under 35 U.S.C. 154(b) by 1030 days.

(21) Appl. No.: 10/559,472

(22) PCT Filed: Jun. 9, 2004

(86) PCT No.: PCT/JP2004/008366

§ 371 (c)(1),
(2), (4) Date: Jan. 31, 2006

(87) PCT Pub. No.: WO2004/112075

PCT Pub. Date: Dec. 23, 2004

(65) Prior Publication Data

US 2006/0120467 A1 Jun. 8, 2006

(30) Foreign Application Priority Data

Jun. 12, 2003 (JP) .............................. 2003-168287

(51) Int. Cl.
*H04K 1/10* (2006.01)
(52) U.S. Cl. ..................................................... 375/260
(58) Field of Classification Search ................. 375/260
See application file for complete search history.

(56) References Cited

U.S. PATENT DOCUMENTS

| 6,865,232 | B1 * | 3/2005 | Isaksson et al. ............. 375/260 |
| 6,870,826 | B1 | 3/2005 | Ishizu |
| 7,277,498 | B2 * | 10/2007 | Hanaoka et al. ............. 375/316 |
| 7,418,240 | B2 * | 8/2008 | Hsu et al. ................ 455/67.13 |
| 2001/0055287 | A1 | 12/2001 | Sawada et al. |
| 2002/0159425 | A1 * | 10/2002 | Uesugi et al. ................ 370/342 |
| 2003/0097623 | A1 * | 5/2003 | Razavilar et al. ............ 714/704 |
| 2004/0081248 | A1 * | 4/2004 | Parolari ....................... 375/259 |

FOREIGN PATENT DOCUMENTS

| JP | 07-183862 | 7/1995 |
| JP | 07183862 A * | 7/1995 |
| JP | 11-074804 | 3/1999 |
| JP | 3061768 | 7/2000 |
| JP | 2000332724 | 11/2000 |

(Continued)

OTHER PUBLICATIONS

Lei, "Adaptive interleaving for bandwidth-efficient OFDM systems", MILCOM 2000, 21st Century Military Communications Conference Proceedings, vol. 2, Oct. 22-25, 2000 pp. 927-931 vol. 2.*

(Continued)

*Primary Examiner*—Juan A Torres
(74) *Attorney, Agent, or Firm*—Dickinson Wright PLLC

(57) ABSTRACT

A multicarrier communication method and a multicarrier communication apparatus used for the method for adjusting the arrangement in code block units according to the actual reception state of the multicarrier signal, when arranging code blocks generated through error correcting coding processing not only in the time axis direction but also in the frequency axis direction in order to improve an error correction rate of a multicarrier signal.

3 Claims, 10 Drawing Sheets

FOREIGN PATENT DOCUMENTS

| | | | |
|---|---|---|---|
| JP | 2000332724 A | * | 11/2000 |
| JP | 2001-103032 | | 4/2001 |
| JP | 2002-9734 | | 1/2002 |
| JP | 3538098 | | 6/2004 |
| WO | 01/86826 | | 11/2001 |
| WO | 02073831 | | 9/2002 |

OTHER PUBLICATIONS

Lei, "Adaptive interleaving for OFDM in TDD systems", IEE Proceedings-Communications, vol. 148, Issue 2, Apr. 2001 pp. 77-80.*

Wang, "Time-frequency code for multicarrier DS-CDMA systems", Vehicular Technology Conference, 2002, VTC Spring 2002. IEEE 55th Publication Date: 2002 vol. 3, On pp. 1224-1227 vol. 3.*

Harada, "OFDM systems with multiple trellis coded modulation", PIMRC 2000, the 11th IEEE International Symposium on Personal, Indoor and Mobile Radio Communications, 2000. vol. 2, Sep. 18-21, 2000 pp. 814-818 vol. 2.*

Qiao, Goodput Enhancement of IEEE 802.11a Wireless LAN Via Link Adaptation:, ICC 2001, 2001 IEEE International Conference on Communications, , Jun. 11-14, 2001, vol. 1, pp. 1995-2000, IEEE.*

IEEE802.11a, Wireless LAN Medium Access Control (MAC) and Physical Layer (PHY) specifications High-speed Physical Layer in the 5 GHz Band, 1999, can be found at http://standards.ieee.org/getieee802/download/802.11a-1999.pdf.*

G.992.1 "Asymmetric digital subscriber line (ADSL) transceivers", ITU, 07 1999, can be found at http://www.itu.int/rec/T-REC-G.992.1-199907-I.*

PCT International Search Report dated Aug. 3, 2004.

Japanese Office Action dated May 23, 2006 with English translation.

Korean Office Action dated Aug. 28, 2006 with English translation.

V. Lau, "Performance of Variable Rate Bit Interleaved Coding for High Bandwidth Efficiency," IEEE, VTC 2000, pp. 2054-2058, Aug. 13, 1999.

S. Lei, et al., "Performance Analysis of Adaptive Interleaving for OFDM Systems," IEEE Transactions on Vehicular Technology, vol. 51, No. 3, pp. 435-444, May 2002.

Office Action on the corresponding Chinese Patent Application dated Sep. 4, 2009.

N. Maeda, et al., "Nijigen Kakusan o Mochiiru VSF-OFCDM to Sono Tokusei—VSF/OFCDM Using Two-Dimensional Spreading and Its Performance," Technical Report of IEICE, vol. 102, No. 86, RCS2002-61, May 2002, pp. 59-64.

K. Sudo, et al., "Shuhasu Sentakusei Phasing Tsushinro ni Okeru Kukan Jikan Shuhasu Block Fugo no Tokusei Hyoka—Performance Evaluation of Space-Time-Frequency Block Codes over Frequency Selective Fading Channels," Technical Report of IEICE, vol. 102, No. 282, RCS2002-156, Aug. 2002, pp. 59-64.

* cited by examiner

| FORMAT TABLE A | |
|---|---|
| | CONTENT |
| 1 | (t,f)=(10,1) |
| 2 | (t,f)=(5,2) |
| 3 | (t,f)=(2,5) |
| 4 | (t,f)=(1,10) |

| FORMAT TABLE B | |
|---|---|
| | CONTENT |
| 1 | (t,f)=(10,1) |
| 2 | (t,f)=(5,2) |
| 3 | (t,f)=(2,5) |
| 4 | (t,f)=(1,10) |
| 5 | (t,f)=(2,10) |
| 6 | (t,f)=(10,2) |
| 7 | (t,f)=(5,4) |
| 8 | (t,f)=(4,5) |

(t,f) = (NUMBER OF SYMBOLS IN TIME AXIS DIRECTION, NUMBER OF SYMBOLS IN FREQUENCY AXIS DIRECTION)

FIG.7

METHOD AND APPARATUS FOR MULTICARRIER COMMUNICATION

TECHNICAL FIELD

The present invention relates to a multicarrier communication method and a multicarrier communication apparatus.

BACKGROUND ART

Conventionally, a technology for enhancing reception performance by carrying out two-dimensional spreading in an OFDM (Orthogonal Frequency Division Multiplexing)/CDMA (Code Division Multiple Access) communication system is described, for example, in Unexamined Japanese Patent Publication No. 2000-332724. The technology described in this Unexamined Japanese Patent Publication No. 2000-332724 arranges spreading chips not only in the time axis direction but also in the frequency axis direction in an OFDM/CDMA communication system so as to reduce inter-code interference caused by loss of orthogonality between the spreading codes.

However, the technology described in Unexamined Japanese Patent Publication No. 2000-332724 is intended to prevent loss of orthogonality between spreading codes in the OFDM/CDMA communication system, and therefore there is a problem that this technology is not capable to use for multicarrier communications other than CDMA scheme communications that do not use spreading chips. Furthermore, since an influence of frequency selective fading per spreading chip becomes a problem, it is not clear whether or not the technology described in Unexamined Japanese Patent Publication No. 2000-332724 is capable to obtain the same effect as a spreading chip even when symbols much longer than spreading chips are arranged two-dimensionally. Moreover, normally in a multicarrier communication, multicarrier signal is subjected to error correcting coding processing such as turbo coding and convolutional coding, and therefore when symbols are arranged two-dimensionally, it is necessary to consider their arrangement in units of code blocks generated through the error correcting coding processing. For this reason, when code blocks are arranged two-dimensionally, it is necessary to consider not only the influence of frequency selective fading but also the influence of multipaths and fading.

Generally, the error rate characteristic of an error correcting code such as turbo code and convolutional code is such that the error rate decreases as the variation of reception quality (e.g., likelihood per bit) of code blocks generated through the error correcting coding processing decreases, while the error rate increases as the variation of quality increases (see FIG. 1A to FIG. 1D) Furthermore, the likelihood per bit depends on the quality per symbol after modulation, that is to say, SNR (Signal to Noise Ratio) and suchlike. For example, when data having 100 bits is subjected to error correcting (FEC) coding at a coding rate R=1/2 and transmitted in QPSK symbols, a signal having 200 bits are generated through FEC coding processing and QPSK symbols are transmitted in 2 bits per one symbol, and therefore 100 QPSK symbols are transmitted. The transmitted QPSK symbols are received by a receiver through a propagation path, but at this time, when an SNR changes for every QPSK symbol, the likelihood changes for every 2 bits after decoding. Deterioration of FEC performance due to the above-descried variation in data quality causes a problem that the error rate characteristic of a signal after error correcting deteriorates when a variation in SNR per symbol in a code block is large, even if average reception quality of a received signal, for example, SNR, is the same, The deterioration of the error rate characteristic due to such SNR variation per symbol in a code block results in a serious problem in a mobile communication system using OFDM signals. A mobile communication system using OFDM signals is affected by the SNR variation in the time axis direction due to fading and affected by the SNR variation in the frequency axis direction due to frequency selective fading caused by multipaths. At this time, there is a feature that the variation in the time axis direction increases as the moving speed of the receiver increases, while the variation in the frequency axis direction increases as a maximum delay time of multipath signals between the transmitter and receiver increases. Furthermore, interference from other cells also increases a great deal for each subcarrier or for each symbol of an OFDM signal. For this reason, especially in cell edge, an SNR per symbol in 1 frame of the OFDM signal fluctuates a great deal, causing reception performance of the OFDM signal to deteriorate.

DISCLOSURE OF INVENTION

It is an object of the present invention, when arranging code blocks generated through error correcting coding processing not only in the time axis direction but also in the frequency axis direction in order to improve an error correction rate of a multicarrier signal, to provide a multicarrier communication method and a multicarrier communication apparatus used for the method for adjusting the arrangement of the multicarrier signal in code block units according to an actual reception state of the multicarrier signal.

The multicarrier communication method according to an embodiment of the present invention comprises a coding processing step of carrying out error correcting coding processing on a multicarrier signal, a transmission step of transmitting the multicarrier signal subjected to the error correcting coding processing, a reception step of receiving the multicarrier signal transmitted, an analysis step of analyzing a reception state based on the multicarrier signal received, and an arrangement adjusting step of adjusting an arrangement of code blocks generated through the error correcting coding processing according to the analysis result in the analysis step.

In the above described multicarrier communication method, preferably in the analysis step, the reception state is analyzed based on Doppler frequency and delay profile of the received multicarrier signal.

In the above described multicarrier communication method, preferably in the analysis step the reception state is preferably analyzed based on a ratio of signal power to interference power for each symbol of the received multicarrier signal.

A multicarrier communication apparatus according to another embodiment of the present invention comprises a coding processing section that carries out error correcting coding processing on a multicarrier signal, an arrangement adjusting section that adjusts an arrangement of code blocks generated through the error correcting coding processing according to an analysis result of a reception state of the multicarrier signal and a transmission section that transmits the multicarrier signal, the arrangement of which has been adjusted.

The above described multicarrier communication apparatus is preferably provided with a plurality of the arrangement adjusting sections and a scheduler that schedules the plurality of multicarrier signals, the arrangements of which have been adjusted.

BRIEF DESCRIPTION OF DRAWINGS

FIG. 7 illustrates an example of a format table referenced when determining an arrangement of code blocks in Embodiment 1 of the present invention;

BEST MODE FOR CARRYING OUT THE INVENTION

An essence of the present invention is to give feedback of an analysis result of a reception state of a multicarrier signal to a transmitter and arrange code blocks generated through error correcting coding processing of a multicarrier signal not only in the time axis direction but also in/the frequency axis direction in 1 frame of multicarrier signal in order to equalize the reception state in the same coding block.

Embodiments of the present invention will be explained in detail below with reference now to the accompanied drawings as appropriate.

Embodiment 1

Figure 1A:
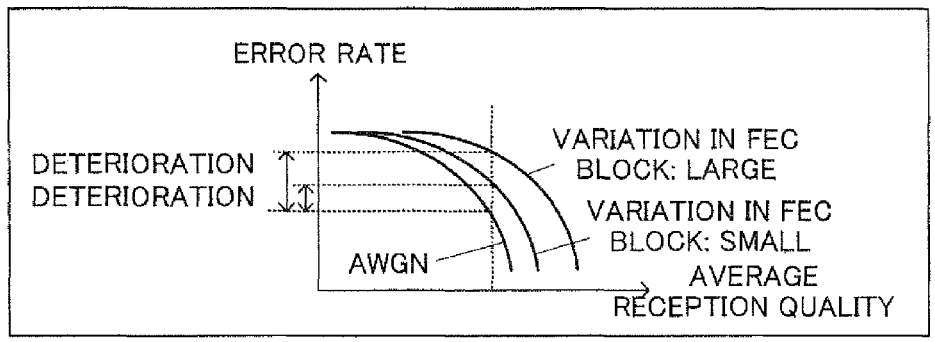
FIG. 1A illustrates the relationship between variation in reception quality of each symbol of a code block and error rate characteristic thereof.
Figure 1B:
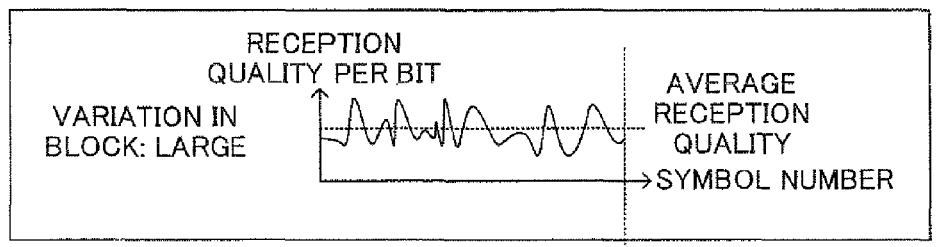
FIG. 1B illustrates a mode of reception quality when a variation in reception quality of each bit in a code block is large.
Figure 1C:
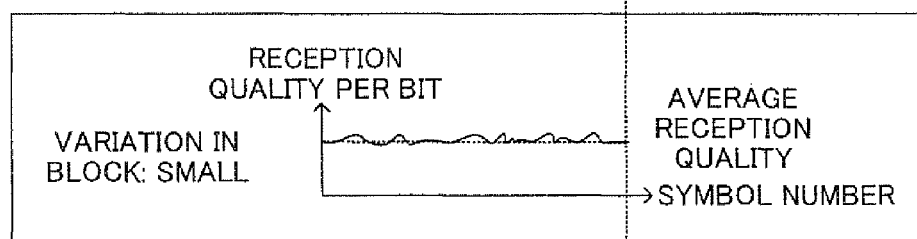
FIG. 1C illustrates a mode of reception quality when a variation in reception quality of each bit in a code block is small.
Figure 1D:
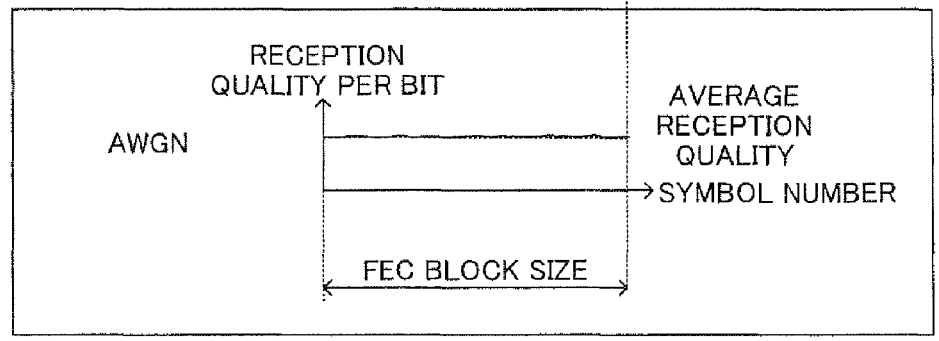
FIG. 1D illustrates a mode of reception quality of additive white Gaussian noise (AWGN)
Figure 2:
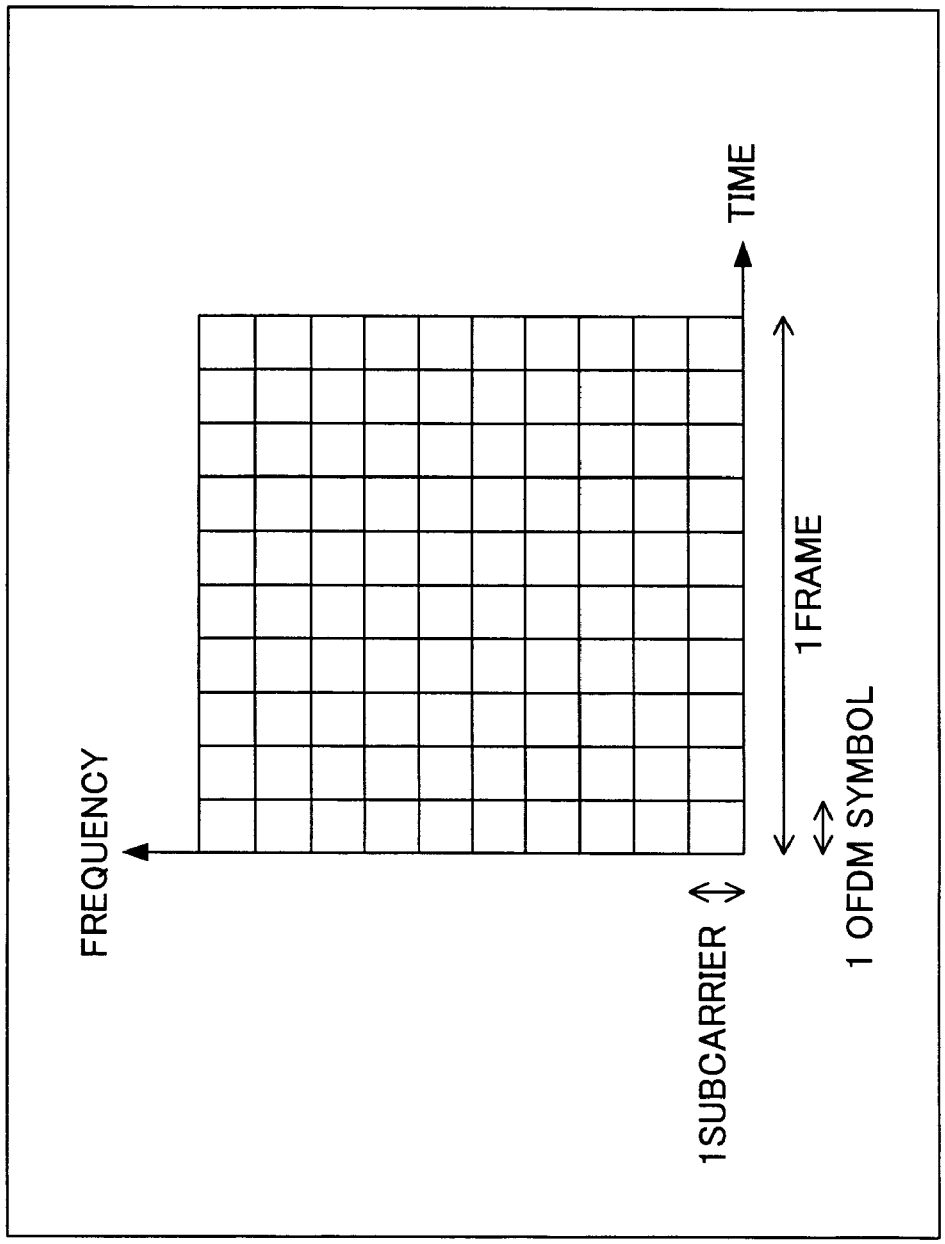
FIG. 2 illustrates a mode of 1 frame of an OFDM signal used according to Embodiment 1 of the present invention.

FIG. 2 shows an OFDM signal consisting of a total of 100 symbols as 1 frame; 10 symbols in the time axis direction and 10 symbols in the frequency axis direction. Embodiment 1 will be explained more specifically by taking a case where this OFDM signal having 100 symbols as 1 frame is transmitted and received as an example.

If a code block generated by carrying out error correcting coding processing on the OFDM signal is assumed to consist of 10 symbols, it is possible to arrange 10 code blocks in 1 frame. This embodiment analyzes SNR variation (reception state) of each symbol in 1 frame of an OFDM signal which has been actually received by a receiver through a propagation path by observing Doppler frequency and delay profile and adjusts the arrangement of code blocks in 1 frame of OFDM signals to be transmitted subsequently based on the analysis result and thereby reduces SNR variations per symbol of code blocks.

Figure 3A:
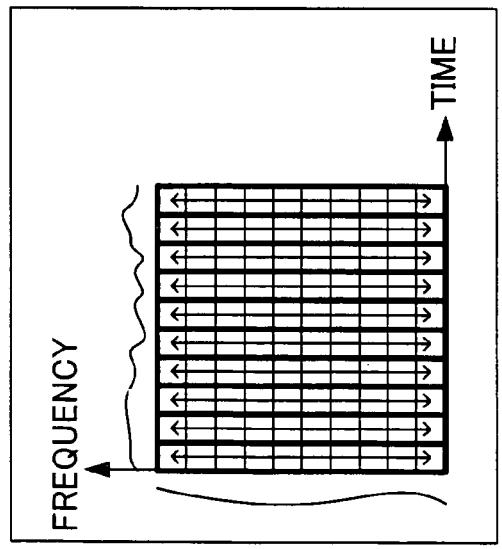
FIG. 3A illustrates a mode according to Embodiment 1 of the present invention in which data in 1 frame of an OFDM signal is arranged in the frequency axis direction when a variation of reception quality in the frequency axis direction is small.
Figure 3B:
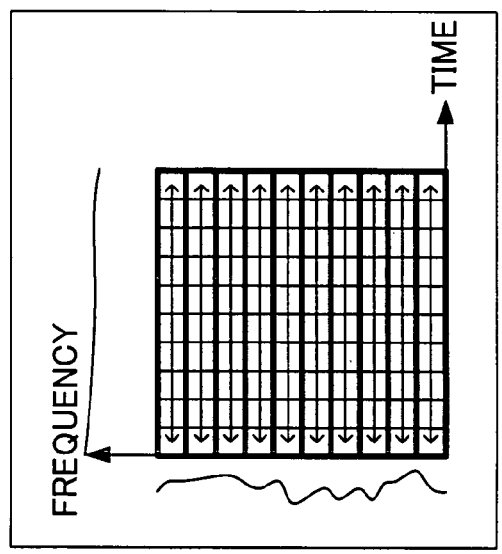
FIG. 3B illustrates a mode according to Embodiment 1 of the present invention in which data in 1 frame of an OFDM signal is arranged in the time axis direction when variation of reception quality in the time axis direction is small.
Figure 3C:
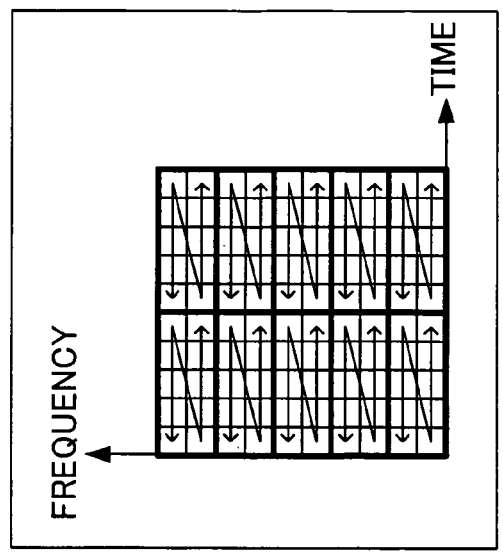
FIG. 3C illustrates a mode according to Embodiment 1 of the present invention in which data in 1 frame of an OFDM signal is arranged as circumstances demand according to variation of reception quality in the frequency axis direction and time axis direction.

The SNR of each symbol fluctuates drastically in the time axis direction when a maximum Doppler frequency observed here is high, while the SNR fluctuates drastically in the frequency axis direction when a maximum delay time is large. Therefore, when the result of an observation of SNR of each symbol shows that the variation is larger in the time axis direction than in the frequency axis direction, for example, when the receiver is moving at a high speed, it is possible to reduce the SNR variation per symbol by arranging code blocks continuously in the frequency axis direction (see FIG. 3A). Likewise, when the variation is larger in the frequency axis direction than in the time axis direction, it is possible to reduce the SNR variation per symbol by arranging code blocks continuously in the time axis direction (see FIG. 3B). Moreover, when the result of an observation of SNR of each symbol shows that although the variation in the frequency axis direction is larger than the variation in the time axis direction, the variation in the time axis direction cannot be ignored, it is also possible, as shown in FIG. 3C, to arrange code blocks each consisting of 5 symbols in the time axis direction having smaller SNR variation and 2 symbols in the frequency axis direction having larger SNR variation.

Thus, code blocks in 1 frame of the OFDM signal can be arranged by analyzing the actual reception state of the OFDM signal and adjusting the arrangement according to the analysis result as appropriate so that the SNR variation per symbol in code blocks becomes smaller. The following modes can be taken as examples of arrangement of code blocks in 1 frame.

Figure 4C:
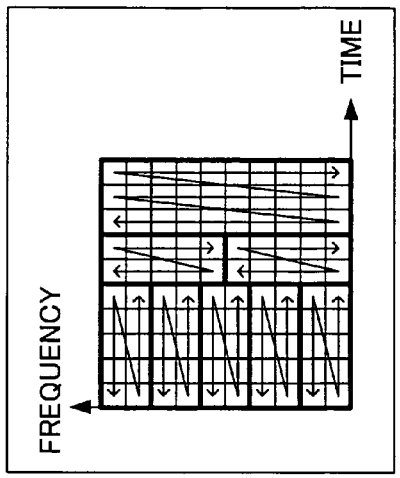
FIG. 4C illustrates an example of arrangement according to Embodiment 1 of the present invention in which the size of a code block (the number of symbols) is changed as appropriate according to a characteristic of error correcting codes.
Figure 4B:
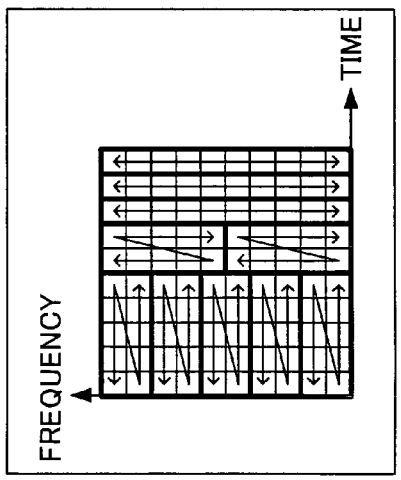
FIG. 4B illustrates an example of arrangement according to Embodiment 1 of the present invention in which the mode of a code block consisting of 10 symbols in 1 frame is modified.
Figure 4A:
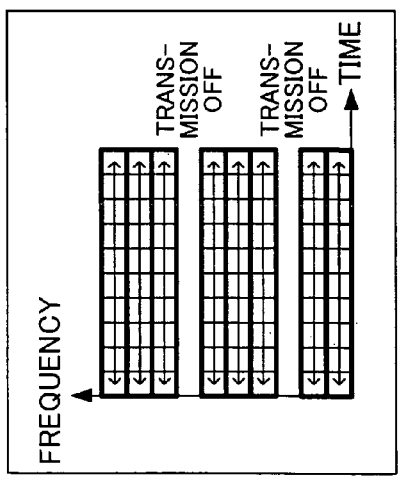
FIG. 4A illustrates an example according to Embodiment 1 of the present invention in which code blocks are not arranged on specific subcarriers in 1 frame.

FIG. 4A shows an example in which no code blocks are arranged for specific subcarriers in 1 frame. According to this arrangement example, when there is considerable influence of frequency selective fading on a specific subcarrier, subcarriers whose reception states severely deteriorated are not used, and it is thereby possible to avoid useless signal transmission, reduce the amount of interference against other cells, suppress transmit power and reduce power consumption.

Furthermore, FIG. 4B shows an arrangement example in which modes of code blocks each consisting of 10 symbols in 1 frame are modified. For example, when shown in terms of frequency axis direction×time axis direction, there can be a mixture of code blocks consisting of 10 symbols×1 symbol, 5 symbols×2 symbols and 2 symbols×5 symbols. This arrangement example is adaptable even when the amount of SNR variation per symbol in 1 frame partly changes.

Furthermore, FIG. 4C shows an arrangement example in which the size (the number of symbols) of a code block is changed according to the characteristic of the error correcting code as appropriate. The error correction rate of a turbo code or the like improves as the number of symbols of the code block increases, and therefore it is possible to increase the size of the code block that can be arranged within in 1 fram. In FIG. 4C, there are 7 code blocks of 10 symbols and 1 code block of 30 symbols.

Figure 4F:
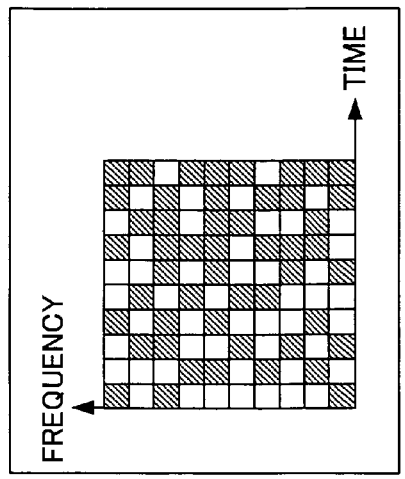
FIG. 4F illustrates an example of arrangement according to Embodiment 1 of the present invention in which when identical OFDM signals are transmitted to two receivers, 50 symbols in 1 frame are distributed and assigned to the respective receivers.
Figure 4E:
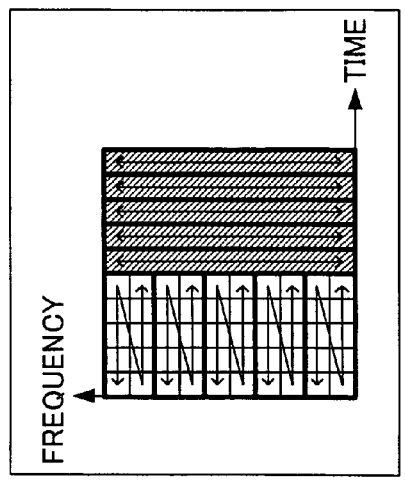
FIG. 4E illustrates an example of arrangement according to Embodiment 1 of the present invention in which when identical OFDM signals are transmitted to a plurality of receivers, code blocks are arranged according to reception states of the respective receivers.
Figure 4D:
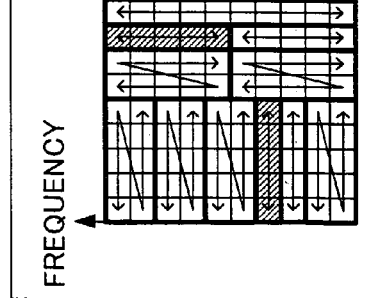
FIG. 4D illustrates an example of arrangement according to Embodiment 1 of the present invention in which one code block is divided and arranged at locations apart from each other, in other words, two code blocks each consisting of 5 symbols are arranged at locations apart from each other.

Furthermore, FIG. 4D shows an example in which 1 code block is divided and the divided portions are arranged away from each other, that is, 2 code blocks each consisting of 5 symbols are arranged away from each other (see hatching of FIG. 4D). According to this arrangement example, it is also possible to adaptively handle a case where parts having approximate reception states appear separately in 1 frame.

Furthermore, FIG. 4E shows an example in which when identical OFDM signals are transmitted to a plurality of receivers, code blocks are arranged according to the reception states of the receivers. According to this arrangement example, it is possible to arrange code blocks according to the reception states of the respective receivers and improve the error rate characteristics of all the receivers.

Furthermore, FIG. 4F shows an arrangement example in which, when identical OFDM signals are transmitted to two receivers, 50 symbols are distributed and assigned to the respective receivers in 1 frame. According to this arrangement example, it is only necessary to select 50 symbols having approximate SNR values in 1 frame as appropriate and construct code blocks with the selected 50 symbols, and therefore it is possible to provide a meticulous arrangement according to the reception state of each receiver and improve the error rate characteristics of all the receivers.

Figure 5:
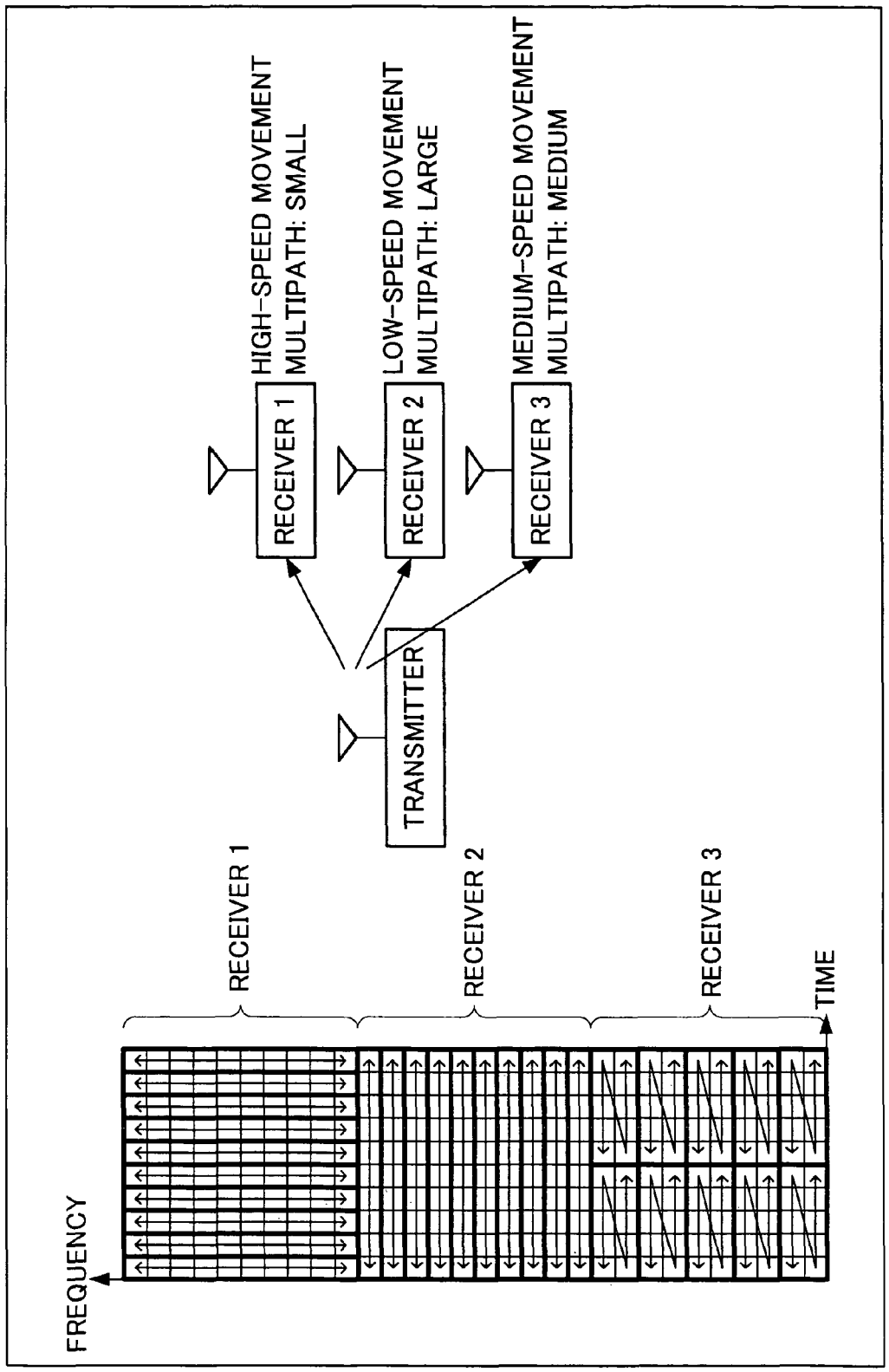
FIG. 5 illustrates an example of arrangement of code blocks in 1 frame of an OFDM signal when there are a plurality of receivers used in Embodiment 1 of the present invention.

Furthermore, FIG. 5 shows an example of arrangement of code blocks when identical OFDM signals are transmitted to three receivers having different OFDM signal reception states. In FIG. 5, receiver 1 is a mobile communication terminal apparatus which is moving at a high speed and is in a reception state in which the influences of multipaths is small. On the other hand, receiver 2 is a mobile communication terminal apparatus which is moving at a low speed and is in a reception state in which the influences of multipaths is large. Furthermore, receiver 3 is a mobile communication terminal apparatus which is moving at a medium speed and is in a reception state in which the influences of multipaths is also at a medium level. When code blocks are arranged in 1 frame according to the reception states of the receivers, it is preferable to arrange code blocks in the frequency axis direction continuously for receiver 1, while it is preferable to arrange code blocks in the time axis direction continuously for receiver 2 and it is preferable to arrange code blocks with 5 symbols in the time axis direction continuously and 2 symbols in the frequency axis direction continuously for receiver 3. By subjecting the code blocks arranged for these three receivers to frequency division multiplexing (FDMA), it is possible to generate a 1-frame OFDM signal. 1 frame of the OFDM signal generated in this way consists of 10 symbols in the time axis direction and 30 symbols in the frequency axis direction, 300 symbols in total.

Figure 6:
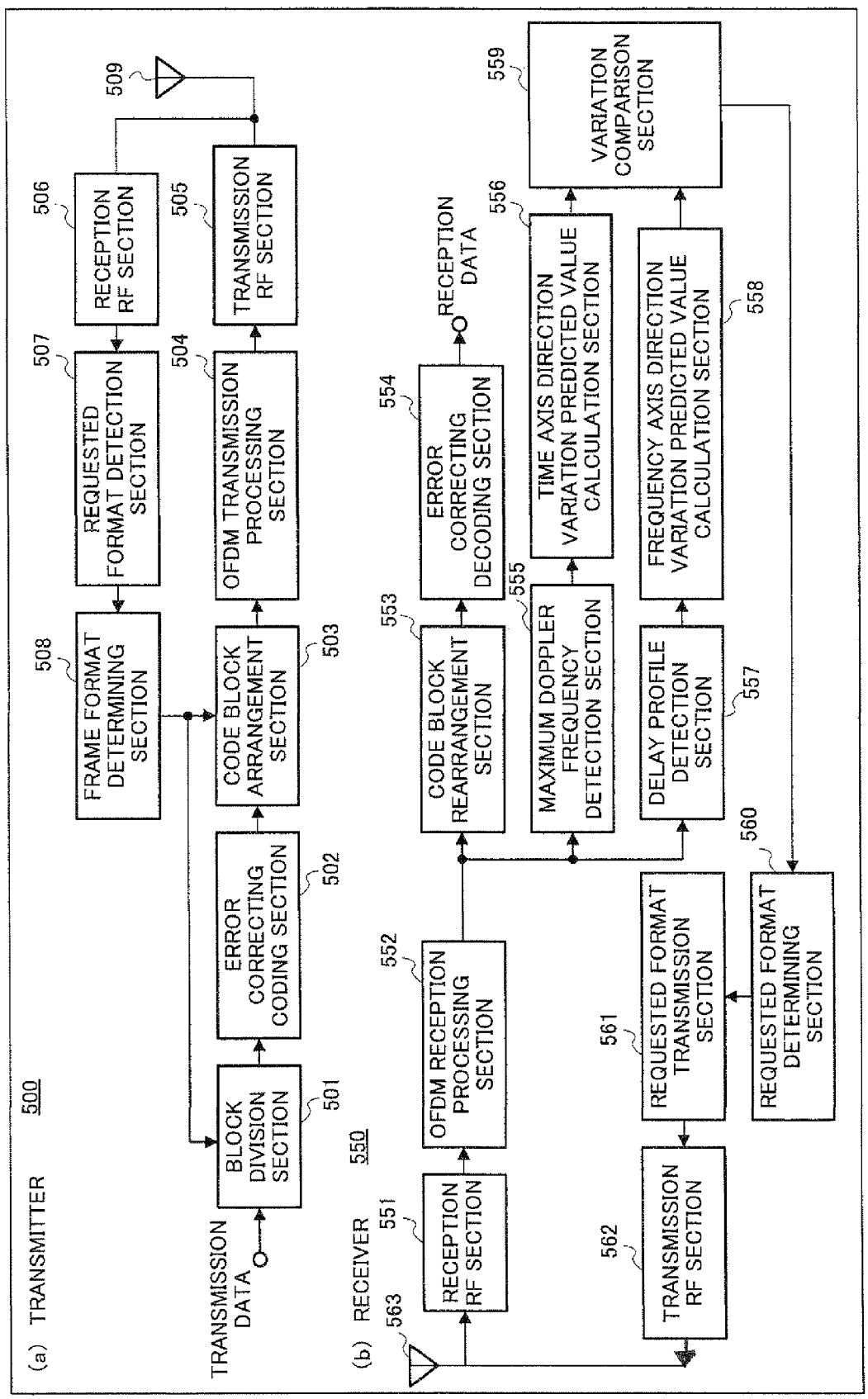
FIG. 6 illustrates a block diagram showing the configuration of a transmitter and receiver used in Embodiment 1 of the present invention.

FIG. 6 is a block diagram showing the configuration of a transmitter (a) and a receiver (b) used for a one-to-one OFDM communication. Transmitter 500 is provided with block division section 501, error correcting coding section 502, code block arrangement section 503, OFDM transmission processing section 504, transmission radio frequency (RF) section 505, reception RF section 506, requested format detection section 507, frame format determining section 508 and antenna element 509. Receiver 550 is provided with reception RF section 551, OFDM reception processing section 552, code block rearrangement section 553, error correcting decoding section 554, maximum Doppler frequency detection section 555, time axis direction variation predicted value calculation section 556, delay profile detection section 557, frequency axis direction variation predicted value calculation section 558, variation amount comparison section 559, requested format determining section 560, requested format transmission section 561, transmission RF section 562 and antenna element 563.

Block division section 501 in transmitter 500 divides transmission data into portions of predetermined size corresponding to code blocks according to an instruction from frame format determining section 508. Individual portions of the transmission data divided by block division section 501 are input to error correcting coding section 502, where the transmission data are subjected to error correcting coding processing such as convolutional coding or the like and processed into code blocks. These code blocks are input to code block arrangement section 503 and rearranged in an arrangement instructed by frame format determining section 508, in other words, in an arrangement instructed in 1 frame converted into an OFDM signal The code blocks input from code block arrangement section 503 to OFDM transmission processing section 504 are subjected to publicly known processing for generating OFDM signals such as serial/parallel conversion, IFFT (Inverse Fast Fourier Transform), parallel/serial conversion and guard interval insertion at OFDM transmission processing section 504. The OFDM signal input from OFDM transmission processing section 504 to transmission RF section 505 is subjected to signal processing such as digital/analog (D/A) conversion, carrier multiplication and amplification here and then transmitted by radio from antenna element 509.

Next, the OFDM signal transmitted from transmitter 500 is received by antenna element 563 of receiver 550 through a propagation path. The OFDM signal received at antenna element 563 is input to reception RF section 551, where it is subjected to signal processing such as amplification, frequency conversion and analog/digital (A/D) conversion. The OFDM signal input from reception RF section 551 to OFDM reception processing section 552 is subjected to signal processing such as serial/parallel conversion, FFT processing and parallel/serial conversion here and then input to code block rearrangement section 553, maximum Doppler frequency detection section 555 and delay profile detection section 557. The code blocks contained in each frame of the OFDM signal input to code block rearrangement section 553 are returned to the original arrangement before the rearrangement in code block arrangement section 503. The code blocks extracted by the rearrangement to the original arrangement are decoded by error correcting decoding section 554 using a publicly known decoding algorithm such as a Viterbi algorithm and sequentially output upon decoding.

Furthermore, a Doppler frequency per symbol of the OFDM signal is measured by maximum Doppler frequency detection section 555 in 1-frame units. Then, the maximum Doppler frequency measured for each symbol is input to time axis direction variation predicted value calculation section 556, where the amount of variation in the time axis direction in 1 frame is calculated. Furthermore, time axis direction variation predicted value calculation section 556 predicts an amount of variation of OFDM signals to be received subsequently in the time axis direction based on the calculated amount of variation in the time axis direction. The amount of variation predicted value in the time axis direction is input to variation amount comparison section 559.

Furthermore, delay profile detection section 557 averages the delay time and signal intensity per symbol of the input OFDM signal in 1-frame units, calculates the distribution of each symbol with respect to the average value and thereby generates a delay profile for each symbol. This delay profile is input to frequency axis direction variation predicted value calculation section 558, where amounts of variation in the frequency axis direction of OFDM signals to be received subsequently are predicted based on the amount of variation in the frequency axis direction in 1 frame of the OFDM signal. These predicted values of amounts of variation in the frequency axis direction are input to variation amount comparison section 559.

Variation amount comparison section 559 compares the predicted values of amounts of variation in the time axis direction about the maximum Doppler frequency input from time axis direction variation predicted value calculation section 556 with the predicted values of amounts of variation in the frequency axis direction about the delay profile input from frequency axis direction variation predicted value calculation section 558 and calculates the ratio of the degree of SNR variation per symbol in the time axis direction in 1 frame of OFDM signals to be received subsequently to the degree of SNR variation in the frequency axis direction. The calculated ratio of SNR variations for each symbol in 1 frame of the OFDM signal is input to requested format determining section 560. Requested format determining section 560 determines an arrangement of code blocks that minimizes the SNR variations per symbol of the code blocks according to the variation ratio in total view of 1 frame of the OFDM signal. It is possible to determine such a code block arrangement, for example, by combining modes of one code block described in the format tables A, B described in FIG. 7 by trial and error and the total evaluation of 1 frame every time. FIG. 7 will be described later.

The format of code block arrangement in 1 frame of the OFDM signal determined by requested format determining section 560 is subjected to publicly known signal processing when the signal is passing through requested format transmission section 561 and transmission RF section 562 and transmitted by radio from antenna element 563.

Next, the signal transmitted by radio from receiver 550 is received by antenna element 509 of transmitter 500 and subjected to signal processing such as amplification, frequency conversion and A/D conversion by reception RF section 506. Then, this transmission signal is input to requested format detection section 507, where the content of the aforementioned format is extracted. Furthermore, this extracted format is input to frame format determining section 508, where sizes of code blocks and arrangement of the code blocks in 1 frame are determined specifically. Then, based on this determination, an instruction on the size (number of symbols) of one code block is input to block division section 501 and an instruction on the arrangement of code blocks in 1 frame of the OFDM signal is input to code block arrangement section 503 respectively from frame format determining section 508. Thereafter, the above described respective sections repeat their respective signal processing.

FIG. 7 shows examples of modes of one code block available to generate a format of an arrangement of code blocks in 1 frame of the OFDM signal determined by requested format determining section 560. Format table A shows examples of modes of a code block consisting of 10 symbols. "(t, f)" in the table represents "(the number of symbols in the time axis direction, the number of symbols in the frequency axis direction)." Furthermore, format table B shows examples of code block modes in a mixture of a code block consisting of 10 symbols and a code block consisting of 20 symbols. Using the format table A or format table B, requested format determining section 560 can determine the arrangement of code blocks in 1 frame by combining these code blocks as appropriate according to the reception state of an OFDM signal.

As explained above, according to the multicarrier communication method and the communication apparatus thereof according to this embodiment, receiver 550 analyzes the reception state of an OFDM signal based on its maximum Doppler frequency and its delay profile, and therefore it is possible to individually analyze adverse influences of a multicarrier signal on the frequency axis direction and adverse influences on the time axis direction caused by the signal passing through a propagation path and meticulously adjust the arrangement of code blocks in 1 frame of the multicarrier signal based on these analysis results.

Embodiment 2

Figure 8:
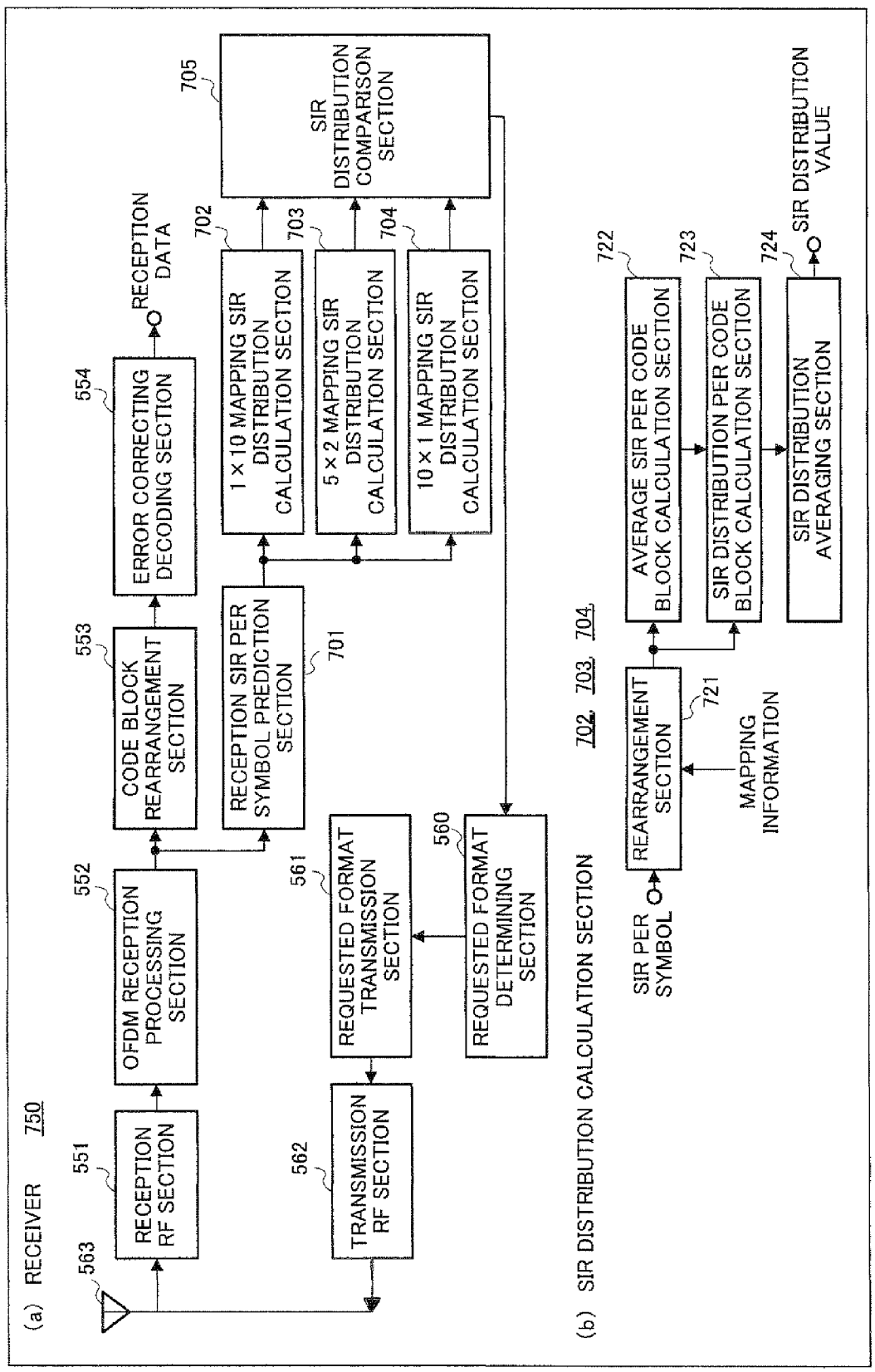
FIG. 8 illustrates a block diagram showing the configuration of a receiver used in Embodiment 2 of the present invention.

FIG. 8 is a block diagram showing the configuration of a receiver used for a multicarrier communication method according to Embodiment 2. In this embodiment, during one-to-one OFDM communication, the receiver predicts the amount of SNR variation per symbol in code blocks of an OFDM signal based on its SIR (Signal-to-Interference power Ratio) and determine the arrangement of the code blocks.

Hereinafter, the multicarrier communication method and a receiver used for the method according to this embodiment will be explained with reference to the attached drawings as appropriate, but components having functions similar to those of the components shown in Embodiment 1 are assigned the same reference numerals and explanations thereof will be omitted.

Receiver 750 corresponds to receiver 550 provided with reception SIR per symbol prediction section 701, 1×10 mapping SIR distribution calculation section 702, 5×2 mapping SIR distribution calculation section 703, 10×1 mapping SIR distribution calculation section 704 and SIR distribution value comparison section 705 instead of maximum Doppler frequency detection section 555, time axis direction variation predicted value calculation section 556, delay profile detection section 557, frequency axis direction variation predicted value calculation section 558 and variation amount comparison section 559.

Furthermore, these three SIR distribution calculation sections 702, 703, 704 are provided with rearrangement section 721, average SIR per code block calculation section 722, SIR distribution per code block calculation section 723 and SIR distribution averaging section 724.

Reception SIR per symbol prediction section 701 stores a 1-frame OFDM signal output from OFDM reception processing section 552 and measures SIRs for all symbols contained therein. The SIRs for all symbols obtained through the measurements are input to 1×10 mapping SIR distribution calculation section 702, 5×2 mapping SIR distribution calculation section 703 and 10×1 mapping SIR distribution calculation section 704.

In 1×10 mapping SIR distribution calculation section 702, the SIR of each input symbol is input to rearrangement section 721. Rearrangement section 721 assumes that code blocks are arranged as shown in FIG. 3A, sorts SIRs of the respective symbols by code block based on this assumption and then sequentially inputs these SIRs for each code block to average SIR per code block calculation section 722 and SIR distribution e per code block calculation section 723 in parallel. Average SIR per code block calculation section 722 calculates an average SIR for each code block. This average SIR is input to SIR distribution per code block calculation section 723. SIR distribution per code block calculation section 723 calculates the distribution for each code block based on the input average SIR and SIR of each symbol in the code block corresponding to the average SIR. This SIR distribution per code block is input to SIR distribution averaging section 724, where the SIR distribution per code block corresponding to 1 frame is collected and averaged. Then, this averaged SIR distribution per code block corresponding to 1 frame is sequentially input to SIR distribution value comparison section 705 as an SIR distribution. Signal processing similar to signal processing by this 1×10 mapping SIR distribution calculation section 702 is also performed by 5×2 mapping SIR distribution calculation section 703 and 10×1 mapping SIR distribution calculation section 704 and respective SIR distribution are input to SIR distribution value comparison section 705. SIR distribution comparison section 705 compares the SIR distribution input from 1×10 mapping SIR distribution calculation section 702, 5×2 mapping SIR distribution calculation section 703 and 10×1 mapping SIR distribution calculation section 704 and selects an arrangement of code blocks in 1 frame so that this SIR distribution becomes a minimum. This selected arrangement of code blocks is reported to requested format determining section 560 and then the format of the arrangement of code blocks is transmitted by radio to transmitter 500 as in the case of Embodiment 1.

As explained above, according to the multicarrier communication method according to this embodiment, the reception state of a multicarrier signal is analyzed based on an SIR per symbol, and therefore it is possible to meticulously analyze the reception state and reliably improve the error correction rate of the multicarrier signal.

This embodiment has explained the case where three SIR distribution calculation sections 702, 703, 704 are used on assumption that code blocks each consisting of 10 symbols are arranged in 1 frame of an OFDM signal, but the present invention is not limited to such a case alone. For example, as long as a plurality of code blocks can be accommodated in 1 frame of the OFDM signal, it is possible to change the size and mode of code blocks or also increase the number of SIR distribution calculation sections.

Embodiment 3

Figure 9:
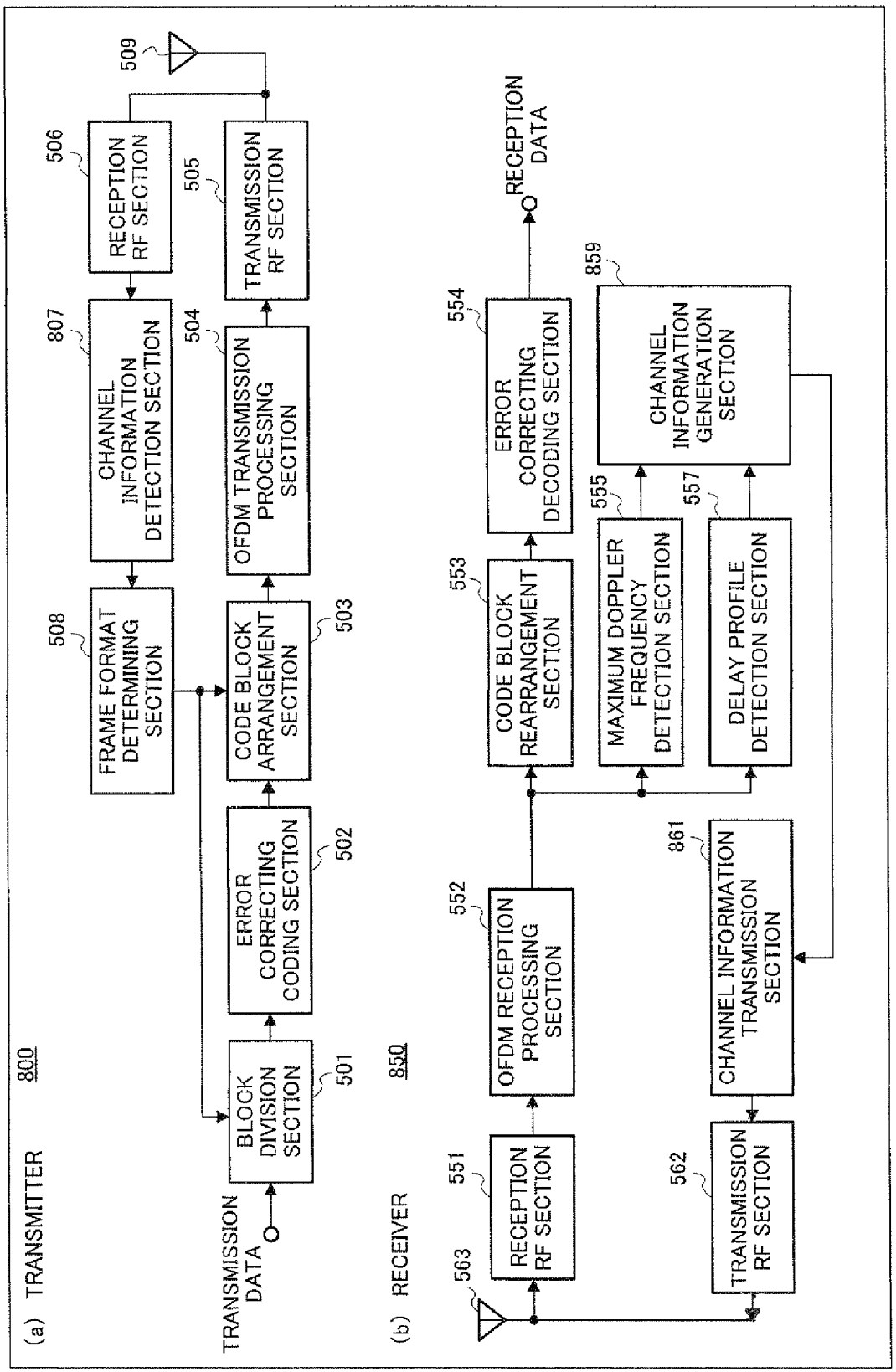
FIG. 9 illustrates a block diagram showing the configuration of a transmitter and receiver used in Embodiment 3 of the present invention.

FIG. 9 is a block diagram showing the configuration of a multicarrier communication apparatus according to Embodiment 3. In this embodiment, during one-to-one OFDM communication, a receiver does not analyze a reception state of an OFDM signal and sends information on the reception state to a transmitter, and then the transmitter analyzes the reception state based on the information and thereby determines an arrangement of code blocks in 1 frame of the OFDM signal.

Hereinafter, the multicarrier communication method and the communication apparatus thereof will be explained with reference to the accompanying drawings as appropriate, but components having the same functions as those of the components shown in Embodiment 1 are assigned the same reference numerals and explanations thereof will be omitted.

Transmitter 800 corresponds to transmitter 500 provided with channel information detection section 807 instead of requested format detection section 507. Channel information detection section 807 analyzes the reception state of an OFDM signal transmitted from receiver 850 based on the following information on the reception state and thereby determines the arrangement of code blocks in 1 frame of the OFDM signal. This information on the reception state of the OFDM signal refers to a maximum Doppler frequency, delay profile, maximum delay time, number of delay waves and delay times of paths, power of the respective paths and channel estimated values of the respective subcarriers or the like.

Furthermore, receiver 850 corresponds to receiver 550 provided with channel information generation section 859 and channel information transmission section 861 instead of time axis direction variation predicted value calculation section 556, frequency axis direction variation predicted value calculation section 558, variation amount comparison section 559, requested format determining section 560 and requested format transmission section 561. Channel information generation section 859 and channel information transmission section 861 generate information on the reception state of the OFDM signal and transmit the information to transmitter 800 by radio.

The multicarrier communication method and the communication apparatus can analyze adverse influences of a multicarrier signal caused by passing through a propagation path on the frequency axis direction and adverse influences on the time axis direction individually and meticulously adjust the arrangement of code blocks in 1 frame of the multicarrier signal based on these analysis results and reduce the load of signal processing on the receiver. In this way, it is possible to simplify the configuration of the receiver and reduce the weight and size of the receiver.

Embodiment 4

Figure 10:
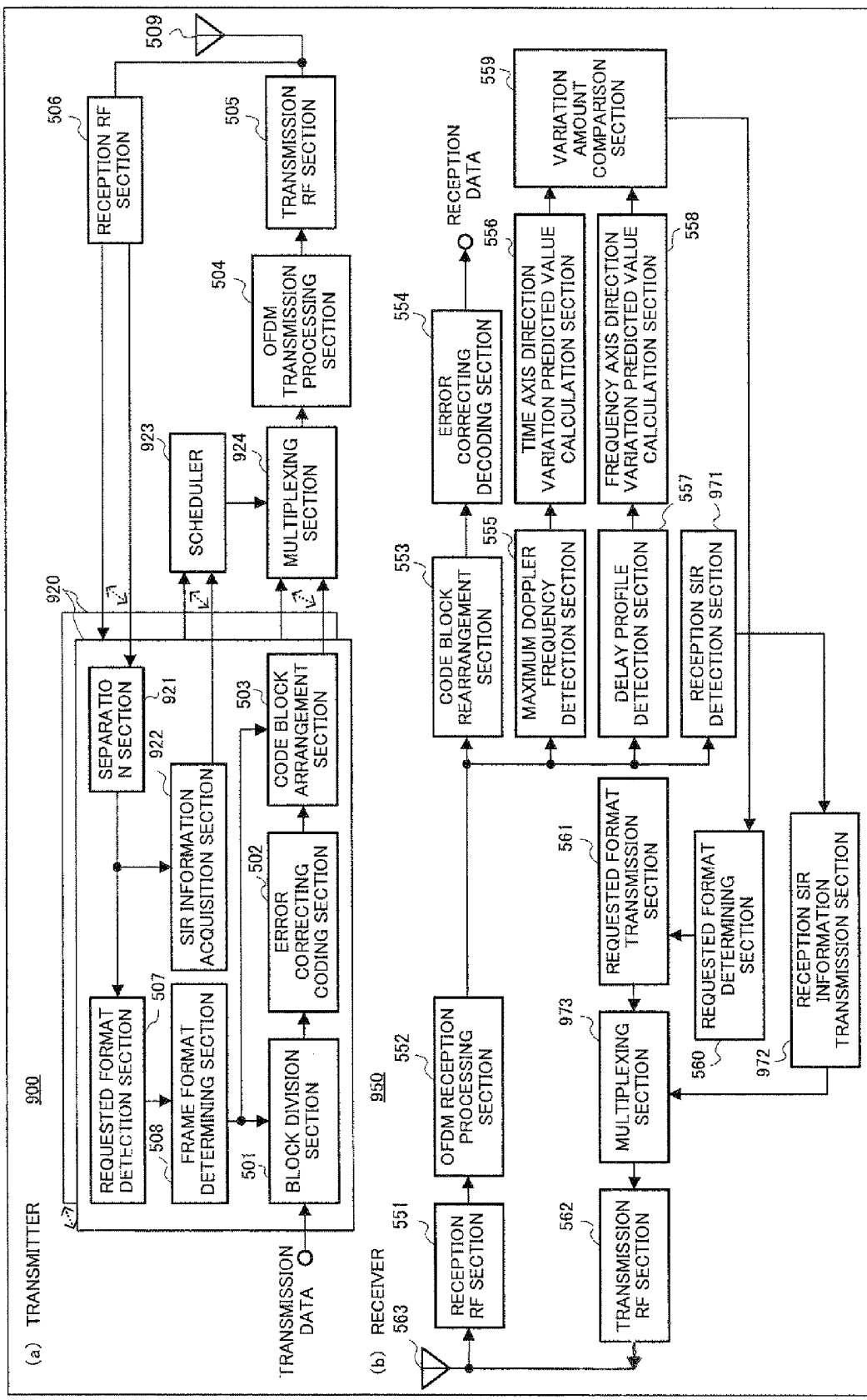
FIG. 10 illustrates a block diagram showing the configuration of a transmitter and receiver used in Embodiment 4 of the present invention.

FIG. 10 is a block diagram showing the configuration of a multicarrier communication apparatus according to Embodiment 4. In this embodiment, a plurality of receivers simultaneously carry out OFDM communications with one transmitter. The multicarrier communication method and the communication apparatus thereof according to this embodiment will be explained below with reference to the accompanying drawings as appropriate, but components having the same functions as those of the components shown in Embodiment 1 will be assigned the same reference numerals and explanations thereof will be omitted.

Transmitter 900 is provided with OFDM transmission processing section 504, transmission RF section 505, reception RF section 506, antenna element 509, scheduler 923, multiplexing section 924 and a plurality of code blocking units 920. Furthermore, code blocking unit 920 is provided in the same number as receivers communicating simultaneously and includes block division section 501, error correcting coding section 502, code block arrangement section 503, requested format detection section 507, frame format determining section 508, separation section 921 and SIR information acquisition section 922. On the other hand, in addition to the components provided for receiver 550, receiver 950 is further provided with reception SIR detection section 971, reception SIR information transmission section 972 and multiplexing section 973.

In receiver 950, an OFDM signal is input from OFDM reception processing section 552 to reception SIR detection section 971. Reception SIR detection section 971 stores SIRs of all symbols in 1 frame of the OFDM signal. These stored SIRs of symbols corresponding to 1 frame are input to reception SIR information transmission section 972, where the SIRs are averaged in 1-frame units. This average SIR is input to multiplexing section 973, multiplexed with a format of an arrangement of code blocks input from requested format transmission section 561 here and then transmitted by radio to transmitter 900.

This signal transmitted by radio from receiver 950 is received by transmitter 900 and then input to separation section 921 in code blocking unit 920. Separation section 921 decides whether or not code blocking unit 920 in which it is included should process the input signal and separates and extracts the average SIR and the format of arrangement of code blocks included in the signal only when separation section 921 obtains a decision result indicating that the input signal should be processed. This average SIR is input to SIR information acquisition section 922, while the format of the arrangement of code blocks is input to requested format detection section 507. SIR information acquisition section 922 acquires information on a reception state of the OFDM signal at receiver 950 based on the input average SIR. All the information on the reception state of the OFDM signal at receiver 950, of which each code blocking unit 920 communicate with, is input to scheduler 923. Scheduler 923 determines the number of symbols and arrangement of code blocks assigned to each receiver 950 about the OFDM signal to be transmitted next time based on the information about reception state of each receiver 950. This determination at scheduler 923 is input to multiplexing section 924, where desired signal processing is performed and the determination is thereby realized.

Therefore, the multicarrier communication method and the communication apparatus thereof according to this embodiment provides a plurality of code blocking units 920 corresponding to the arrangement adjusting sections and a scheduler that selects and combines the outputs from the code blocking units as appropriate, and therefore when multicarrier signals are transmitted to a plurality of receivers, it is possible to adjust the arrangement of code blocks on the multicarrier signal considering the reception states of all receivers so as to increases overall error correction rate.

In this embodiment, M-ary modulation scheme may be adopted, and in that case code blocks can be arranged by separately grouping bits into higher bits and lower bits.

As described above, the present invention analyzes the actual reception states of multicarrier signals, adjusts the arrangement of code blocks according to the analysis result as appropriate, and therefore it is possible to adaptively correspond to adverse influences from constantly changing propagation path and reliably improve the error correction rate of the multicarrier signal.

Furthermore, the present invention observes a Doppler frequency and delay profile simultaneously, thereby making it is possible to analyze adverse influences caused by passing through a propagation path on the frequency axis direction and adverse influences on the time axis direction individually and meticulously adjust the arrangement of code blocks based on these analysis results.

Furthermore, the present invention analyzes the reception state of a multicarrier signal based on SIRs of respective symbols, and can thereby obtain a much more accurate analysis result and reliably improve the error correction rate of the multicarrier signal.

Furthermore, the present invention is provided with a scheduler that selects and combines outputs from a plurality of arrangement adjusting sections as appropriate, and therefore when multicarrier signals are transmitted to a plurality of receivers, it is possible to adjust the arrangement of code blocks of a multicarrier signal considering all the receivers so as to increases overall error correction rate.

The present invention analyzes the actual reception states of a multicarrier signal and adjusts the arrangement of code blocks according to the analysis result as appropriate, and it is possible to reliably improve the error correction rate of the multicarrier signal by adaptively responding to adverse influences from a momentarily changing propagation path.

This application is based on Japanese Patent Application No. 2003-168287 filed on Jun. 12, 2003, entire content of which is expressly incorporated by reference herein.

INDUSTRIAL APPLICABILITY

The present invention is applicable to a multicarrier transmission apparatus and multicarrier reception apparatus mounted in a mobile station apparatus or base station apparatus in a mobile communication system.

The invention claimed is:

1. A multicarrier communication apparatus, comprising:
a coding section that carries out error correcting coding on data to generate code blocks;
a generation section that generates a multicarrier signal comprising the code blocks;
a transmission section that transmits the multicarrier signal; and
an adjusting section that adjusts an arrangement of the code blocks on a two-dimensional plane defined by a frequency axis and a time axis, in accordance with dispersion of received quality per symbol of the code blocks,
wherein the adjusting section arranges the code blocks continuously on the frequency axis when the dispersion of received quality on the time axis is greater than the dispersion of received quality on the frequency axis, or arranges the code blocks continuously on the time axis when the dispersion of received quality on the frequency axis is greater than the dispersion of received quality on the time axis.

2. The multicarrier communication apparatus according to claim 1, wherein the adjusting section adjusts the arrangement of the code blocks in accordance with dispersion value of a reception SIR per symbol of the code blocks.

3. A multicarrier communication method, comprising:
a coding step of carrying out error correcting coding on data to generate code blocks;
a generation step of generating a multicarrier signal comprising the code blocks;

a transmission step of transmitting the multicarrier signal; and an adjustment step of adjusting an arrangement of the code blocks on a two-dimensional plane defined by a frequency axis and a time axis, in accordance with dispersion of received quality per symbol of the code blocks, wherein, in the adjustment step, the code blocks are arranged continuously on the frequency axis when the dispersion of received quality on the time axis is greater than the dispersion of received quality on the frequency axis, or are arranged continuously on the time axis when the dispersion of received quality on the frequency axis is greater than the dispersion of received quality on the time axis.

* * * * *